Jan. 14, 1964   W. SPINGLER   3,117,769
ELECTRIC MOTOR-DRIVEN FOOD MIXER
Filed March 8, 1960

INVENTOR
WERNER SPINGLER
BY Bailey, Stephens + Huettig
ATTORNEYS

United States Patent Office 3,117,769
Patented Jan. 14, 1964

3,117,769
ELECTRIC MOTOR-DRIVEN FOOD MIXER
Werner Spingler, Neuffen, Wurttemberg, Germany, assignor to ESGE Gschwend & Spingler KG., Neuffen, Wurttemberg, Germany, a company
Filed Mar. 8, 1960, Ser. No. 13,552
Claims priority, application Germany Mar. 11, 1959
2 Claims. (Cl. 259—122)

This invention relates to an electric motor-driven domestic food mixer with a motor housing in the form of a handle and a driving shaft protruding from this housing. The shaft carries at its free end the mixing tool and is surrounded by a protective tube containing at the end of the tool a sinter bearing in which the shaft rotates. Experience has shown there is a certain danger, even when the bearing of the driving shaft is arranged in a sinter bearing, that parts of the liquid or pulpy food to be processed may penetrate into the space between the driving shaft and the protective tube. It further can also happen that oil from the sinter metal bearing extruded into the material to be processed. It is an object of the invention to avoid the above disadvantages.

This object and other objects will be apparent from a description of the preferred form of the invention which is shown by way of illustration in the accompanying drawings wherein.

Figure 1:
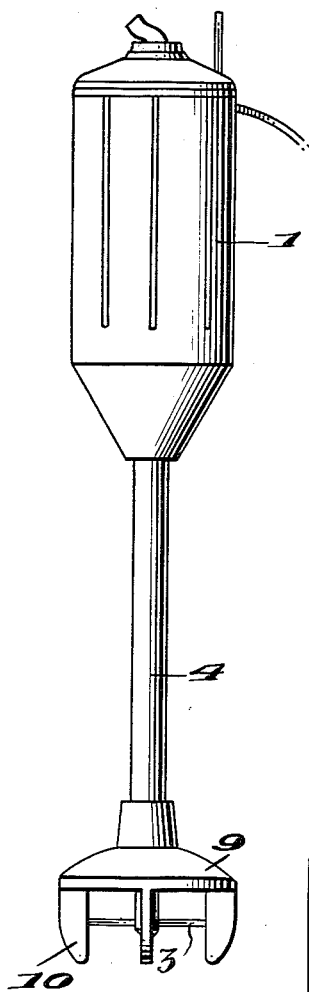
FIG. 1 is a lateral view of a food mixer embodying the invention.
Figure 2:
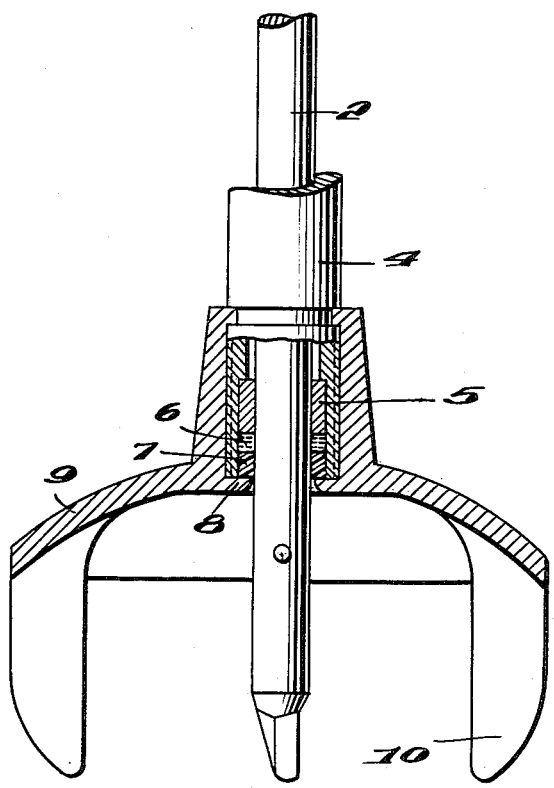
FIG. 2 is an axial section thereof.

The electromotor driving the food mixer is contained in the housing 1 serving simultaneously as a handle. The motor rapidly rotates the shaft 2 on which the tool 3 is fastened. The shaft is surrounded by the protective tube 4 mounted with its upper part in the motor housing 1. At its lower end the protective tube 4 contains a sinter bearing 5 in which the driving shaft 2 rotates. Below the sinter bearing 5 and a layer 6 of grease there is inserted under pressure in the space below the protective tube 4 and the driving shaft 2 a gasket ring of circular section. The gasket ring consists of plastic, which plastic is elastic, heat resistant, to a maximum degree chemically resistant, and also abrasion resistant. The gasket ring is dimensioned so that it can be fitted into the space between the protective tube 4 and the driving shaft 2 without further finishing. Upon insertion the gasket ring is compressed in a precisely predetermined degree, so that there is obtained a sufficient tightness and further upon rotation of the driving shaft 2 as small a friction as possible.

The gasket ring 7 is secured against falling out by means of an annular type projection 8 of the protective hood 9 connected with baffle plates 10. This projection has the effect that the space below the gasket ring 7, which is difficult of access and still comes into contact with the material to be processed, is as small as possible, so that the small amounts of food which possibly may adhere in this space are, after drying of the material, no longer in a position to block the shaft 2 in such a manner that the motor can no longer tear apart these food residues.

What I claim is:

1. An electric motor-driven food mixer comprising a motor housing in the form of a handle and a driving shaft protruding from said housing, a protective tube surrounding said driving shaft and spaced therefrom at least at its lower end, a sinter bearing in which said shaft is rotatably mounted arranged in said space between the shaft and the protective tube near the lower end of the tube, a gasket ring of normally circular section of elastic, heat resistant, chemically resistant and abrasion resistant plastic located in the space between said protective tube and said driving shaft and spaced below said sinter bearing, body of lubricant in the space between the bearing and the gasket ring, said gasket ring having a sectional diameter greater than the width of said space and being deformed from its normally circular cross-section when inserted into the space so as to be compressed therein, and a wall located below said gasket ring.

2. In a food mixer according to claim 1, a mixing tool on the lower end of said shaft, a protective hood surrounding the tool secured on said protective tube, said hood having an interior annular projection constituting said wall.

References Cited in the file of this patent
UNITED STATES PATENTS

| | | |
|---|---|---|
| 2,428,411 | Davis | Oct. 7, 1947 |
| 2,518,338 | Lampe | Aug. 8, 1950 |
| 2,570,117 | Hallstrand | Oct. 2, 1951 |
| 2,829,931 | De Pree et al. | Apr. 8, 1958 |
| 2,884,269 | Reinke et al. | Apr. 28, 1959 |
| 2,901,295 | Becker | Aug. 25, 1959 |

FOREIGN PATENTS

| | | |
|---|---|---|
| 288,357 | Switzerland | May 16, 1953 |
| 315,820 | Switzerland | Oct. 31, 1956 |